United States Patent Office 3,245,927
Patented Apr. 12, 1966

3,245,927
COATING COMPOSITIONS CONTAINING
CYCLIC ACETALS
Carol K. Ikeda, Wallingford, Pa., assignor to E. I. du Pont de Nemours and Company, Wilmington, Del., a corporation of Delaware
No Drawing. Filed Mar. 11, 1959, Ser. No. 798,602
The portion of the term of the patent subsequent to Sept. 12, 1979, has been disclaimed
15 Claims. (Cl. 260—23)

This application is a continuation-in-part of my copending applications Serial Nos. 737,506, now U.S. Patent No. 3,010,923; 737,507, now U.S. Patent No. 3,010,918, and 737,510, now abandoned, all filed May 26, 1958; 738,624 filed May 29, 1958, now U.S. Patent No. 3,058,-934; 740,571 filed June 9, 1958, now U.S. Patent No. 3,010,924; 750,576 filed July 24, 1958, now abandoned, and 753,199 filed August 5, 1958, now U.S. Patent No. 3,053,792. Said Serial No. 737,506 is a continuation-in-part of my copending Serial No. 730,070, filed April 22, 1958, now abandoned, which in turn is a continuation-in-part of my copending Serial No. 683,021 filed September 10, 1957, now abandoned. Said Serial No. 738,624 is also a continuation-in-part of Serial No. 683,021.

This invention relates to organic film-forming compositions. More particularly, it relates to liquid coating compositions employing as an essential film-forming material a mixture of compounds containing 2-vinyl-1,3-cyclic acetal groups of a kind more specifically defined hereinafter.

The film-forming mixtures based on compounds containing 2-vinyl-1,3-cyclic acetal groups, referred to above, are particularly valuable because they provide a new class of compositions suitable for making air-drying coating compositions. Many of such compositions are themselves liquid and so make possible the preparation of solvent-free coating compositions. This is a particularly desirable property, since it makes possible the application of a thick protective coating in one application. In other words, a greater film thickness can be obtained from a single application than can be obtained with the usual coating compositions which contain relatively large amounts of solvent. The latter kind of compositions normally require multicoat operations to provide adequate film thickness.

I have found that mixtures of (1) at least one compound containing a single 2-vinyl cyclic acetal radical, (2) at least one compound containing two or more of such radicals and (3) metallic drier compound provide useful and valuable film-forming compositions which air-dry. By air-drying is meant converting in the presence of oxygen (as in air) to an insoluble condition, i.e., wherein the converted or cured substance is insoluble in, or not materially softened by, a liquid which is a solvent for the unconverted material.

Analyses by chemical and infrared absorption techniques indicate that this property evolves as a result of a new and unique mechanism in which oxygen is absorbed, acrylic ester and hydroxyl structures progressively appear, and the cyclic acetal structure and vinyl unsaturation progressively disappear as the insolubilization proceeds.

Air-drying can occur at an acceptable rate at normal atmospheric temperatures above about 40° F., at ordinary room temperatures, and at force-dry or baking temperatures of about 100°–400° F. Usually, the higher the temperature, the faster the drying speed.

The characteristic common to both classes of vinyl cyclic acetal compounds used in the mixtures of this invention is the presence of the 2-vinyl-1,3-cyclic acetal structure in the molecule. This structure is represented by

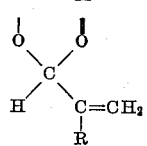

in which the remaining oxygen valences are satisfied in a cyclic structure by separate carbon atoms and in which R is a monovalent radical selected from the class consisting of hydrogen, alkyl, alkenyl, aryl, chloro, fluoro, bromo, cyano, acyloxy, chloroalkyl, fluoroalkyl, cyanoalkyl, alkoxy, aryloxy and carbalkoxy.

As to proportions, they generally fall in the range of 0.5%–90% of monofunctional compound to (complementally) 99.5%–10% of polyfunctional compound based on the total weight of the two classes. However, it will be evident from the nature of individual members of each class, discussed more fully hereinafter, that in some cases these ranges exceed the solubility limits of certain specific combinations. In such cases, it is obviously preferable to limit the proportions to those wherein a homogeneous mixture or solution exists at the ambient temperature or can be obtained by adding a permissible amount of a common solvent. In most cases the beneficial effects of both the monofunctional and the polyfunctional compounds on the mixture begin to show profoundly at or near the 10% level, so a preferred range of proportions is 10%–90% of monofunctional compound to (complementally) 90%–10% of polyfunctional compound based on the total weight of the two classes.

MONOFUNCTIONAL COMPOUNDS

The following classes of 2-vinyl-1,3-cyclic acetal compounds illustrate those containing a single 2-vinyl cyclic acetal radical per molecule that are required in this invention:

(1) Esters of hydroxy-substituted 2-vinyl dioxolanes, dioxanes, dioxepanes, dioxocanes, dioxonanes, or dioxecanes, such as:

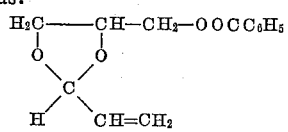

which is
(2-vinyl-1,3-dioxolan-4-yl)-methyl benzoate.
(2-vinyl-1,3-dioxolan-4-yl)-4′-butyl undecylenate.
Methyl(2-vinyl-1,3-dioxolan-4-yl)-4′-butyl phthalate.
Methyl(2-isopropenyl-5-ethyl-1,3-dioxan-5-yl)-methyl sebacate.
(2-vinyl-1,3-dioxepan-5-yl)-4′-butyl octoate.
Diacetate of 5,5-bis(hydroxymethyl)-2-vinyl-1,3-dioxane.
Bis(2-chloro-4-ethyl benzoate) of 5,5-bis(hydroxymethyl)-2-vinyl-1,3-dioxane.

(2) Esters of carboxy-substituted 2-vinyl dioxolanes, dioxanes, dioxepanes, dioxocanes, dioxonanes, or dioxecanes, such as:

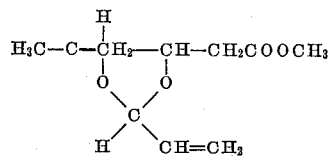

which is methyl(2-vinyl-4-methyl-1,3-dioxan-6-yl) acetate.

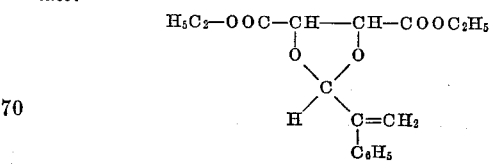

which is 4,5-bis carbethoxy-2-alphaphenylvinyl-1-,3-dioxolane.

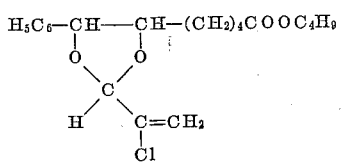

which is omega-butyl(4-phenyl-2-alphachlorovinyl-1-,3-dioxolan-5-yl) butyrate.

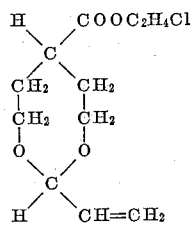

which is beta-chloroethyl(2-vinyl-1-,3-dioxocan-5-yl) carboxylate.

(3) Ethers of hydroxy substituted 2-vinyl dioxolanes, dioxanes, dioxepanes, dioxocanes, dioxonanes, or dioxecanes, such as:

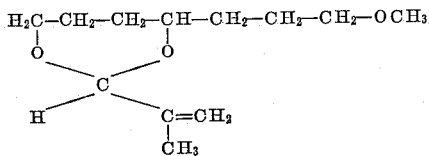

which is
4-(omegamethoxypropyl)-2-isopropenyl-1-,3-dioxepane.
2[4'-(2''-vinyl-1'',3''-dioxolan-4''-yl)-butoxy]-tetrahydropyran.
4-(2'-vinyl-1',3'-dioxolan-4'-yl)-butyl betacyanoethyl ether.
4-(2'-vinyl-1',3'-dioxolan-4'-yl)-butyl tetrafluoroethyl ether.
4-(allyloxymethyl)-2-alphaethoxyvinyl-1-,3-dioxolane.
4-(2'-vinyl-1',3'-dioxolan-4'-yl)-butyl octyl ether.
4-(2'-vinyl-1',3'-dioxolan-4'-yl)-butyl phenyl ether.

(4) Hydrocarbon-substituted 2-vinyl dioxolanes, dioxanes, dioxepanes, dioxocanes, dioxonanes, or dioxecanes, such as:

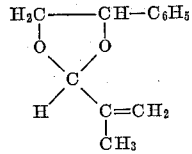

which is
4-phenyl-2-isopropenyl-1,3-dioxolane.
5-vinyl-5-methyl-2-alphacyanoethylvinyl-1,3-dioxane.
4-phenyl-5-butyl-2-alphaethoxyvinyl-1,3-dioxolane.
5-butyl-2-vinyl-1,3-dioxepane.
4,4,6-trimethyl-2-vinyl-1,3-dioxane.
4-omegabutenyl-2-isopropenyl-1,3-dioxolane.

(5) Spiro-carbon-containing 2-vinyl dioxolanes, dioxanes, dioxepanes, dioxocanes, dioxonanes, or dioxecanes, such as:

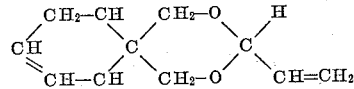

which is spiro(3-vinyl-2-,4-dioxane-6,6'-cyclohex-2'ene).

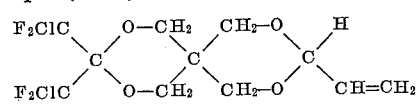

which is 3-vinyl-9,9-bis(difluorochloromethyl)spirobi(metadioxane).

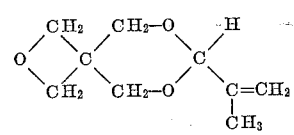

which is spiro (3-isopropenyl-2,4-dioxane-6,1'-oxetane).

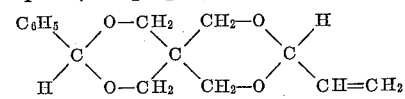

which is 3-vinyl-9-phenyl-spirobi(metadioxane).

(6) Fused ring compounds, one ring of which is a 2-vinyl dioxolane, dioxane, dioxepane, dioxocane, dioxonane, or dioxecane, such as

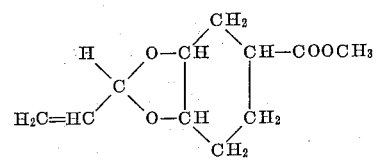

which is the acrolein acetal of methyl-3,4-dihydroxy cyclohexane carboxylate.

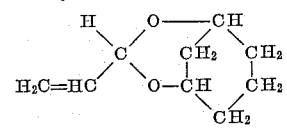

which is the acrolein acetal of 1,3-dihydroxycyclohexane.

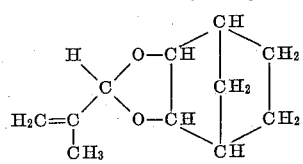

which is the methacrolein acetal 2,3-dihydroxybicyclo-(2.2.1)-heptane.

(7) Miscellaneous substituted 2-vinyl dioxolanes, dioxanes, dioxepanes, dioxocanes, dioxonanes, or dioxecanes, such as:

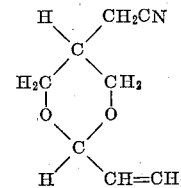

which is
5-cyanomethyl-2-vinyl-1,3-dioxane.
5-ethyl-5-nitro-2-vinyl-1,3-dioxane.
5,5-bis(hydroxymethyl)-2-isopropenyl-1,3-dioxane.
5-chloromethyl-2-alphacyanovinyl-1,3-dioxane.

A preferred class of monofunctional 2-vinyl cyclic acetal compound for use in this invention is represented by the structural formula

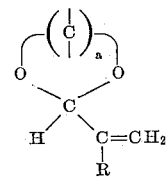

in which

represents carbon atoms in the ring, a being an integer having a value of at least 2, all of the valences of said carbon atoms being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl, fluoroaryl, acyloxy, acyloxyalkyl, carbalkoxy and alkylcarbalkoxy when the value of $a$ is 2, and consisting additionally of fluoro, chloro, acylamido and phenylsulfonyl when the value of $a$ is greater than 2; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy.

POLYFUNCTIONAL COMPOUNDS

The following classes of 2-vinyl-1,3-cyclic acetal compounds illustrate those containing two or more 2-vinyl cyclic acetal radicals per molecule that are required in this invention:

A. Compounds containing two or more 2-vinyl-1,3-cyclic acetal radicals represented by the structural formula

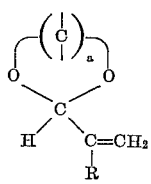

in which

represents carbon atoms in the ring (i.e., linking the two oxygen atoms), $a$ is an integer having a value of at least 2, preferably 2 or 3, all but one of the valences of said carbon atoms (i.e., $2a-1$ of the valences) are satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of $a$ is 2, and consisting additionally of fluoro, chloro, acylamido and phenylsulfonyl when the value of $a$ is greater than 2, and R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy. The sole valence of the

group not satisfied in the above definition is the valence through which the cyclic radical is connected to at least one other such radical usually by means of a polyvalent connecting radical. These compounds and methods by which they are prepared are disclosed and claimed in U.S. Patent 3,010,923 and U.S. Patent 3,010,918.

Specific examples of the compounds described in the foregoing paragraph A are set forth in the ensuing sections 1-4.

(1) Di- and higher esters of hydroxy-substituted dioxolanes, dioxanes, dioxepanes, dioxocanes, dioxonanes, or dioxecanes, such as

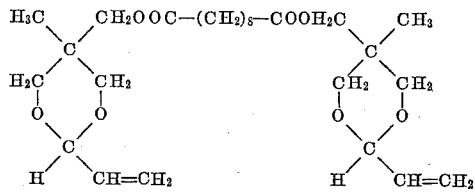

which is the

Sebacic acid diester of 5-hydroxymethyl-5-methyl-2-vinyl-1,3-dioxane.
Orthophthalic acid diester of 4-(3'-hydroxypropyl)-2-vinyl-1,3-dioxepane.
Itaconic acid diester of 4-(4'-hydroxybutyl)-2-vinyl-1,3-dioxolane.
Fumaric acid diester of 4-hydroxymethyl-2-vinyl-1,3-dioxolane.

(2) Esters of carboxy-substituted 2-vinyl dioxolanes, dioxanes, dioxepanes, dioxocanes, dioxonanes, or dioxecanes, such as:

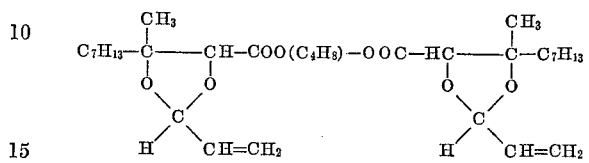

which is the

Butanediol diester of 5-heptyl-5-methyl-2-vinyl-1,3-dioxolan-4-yl carboxylic acid.
Trimethylolethane triester of 4-betacyanoethoxyethyl-2-vinyl-1,3-dioxolan-5-yl carboxylic acid.

(3) Ethers of hydroxy-substituted 2-vinyl dioxolanes, dioxanes, dioxepanes, dioxocanes, dioxonanes, or dioxecanes, such as

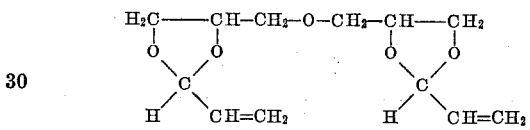

which is the

Diether of 4-hydroxymethyl-2-vinyl-1,3-dioxolane.
Diphenylolpropane diether of 4-hydroxymethyl-2-vinyl-1,3-dioxolane.
Dimethylolurea diether of 4-(3'-hydroxypropyl)-2-vinyl-1,3-dioxepane.

(4) Miscellaneous compounds containing two or more 2-vinyl cyclic acetal radicals, such as:

1,2-bis(2'-vinyl-1',3'-dioxan-4'-yl)ethane.
Triorthoaluminate of 4-hydroxymethyl-2-vinyl-1,3-dioxolane.
p-Bis(2-isopropenyl-1,3-dioxan-4-yl)benzene.
Tricyanurate of 4-(4'-hydroxybutyl)-2-vinyl-1,3-dioxolane.
Tolylene diisocyanate diurethane of 4-hydroxymethyl-2-vinyl-1,3-dioxolane.

B. Spiro compounds containing two or more 2-vinyl cyclic acetal radicals such as:

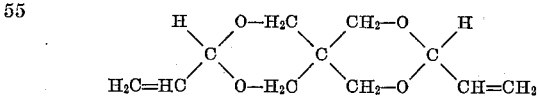

which is 3,9-divinyl-spirobi(meta dioxane) or the bis-acrolein acetal of pentaerythritol.

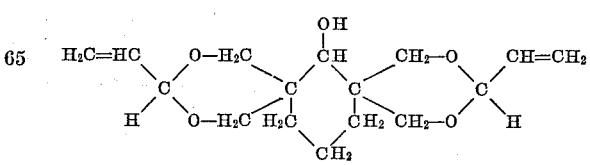

which is the

Bis-acrolein acetal of 2,2,5,5-tetrakis(hydroxymethyl)cyclohexanol.
Esters of the immediately preceding formula, C. Fused ring compounds containing two or more 2-vinyl cyclic acetal radicals, such as:

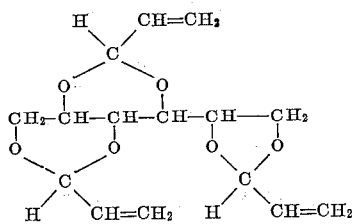

which is the tris-acrolein acetal of sorbitol.

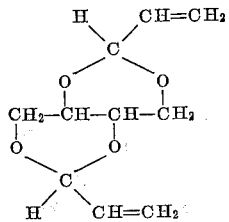

which is the bis-acrolein acetal of erythritol.

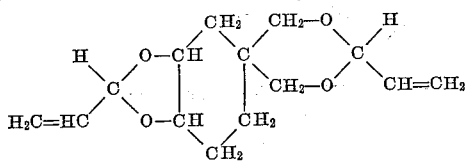

which is the bis-acrolein acetal of 1,1-bis(hydroxymethyl)-3,4-dihydroxycyclohexane.

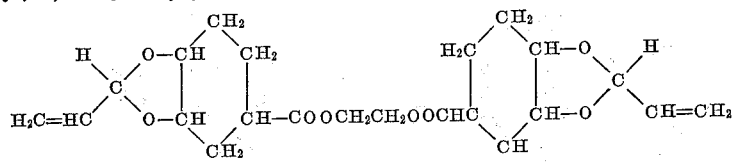

which is the ethylene glycol diester of the acrolein acetal of 3,4-dihydroxycyclohexane carboxylic acid.

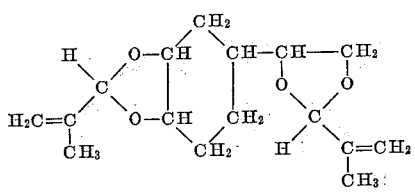

which is the bis-methacrolein acetal of the tetral obtained by hydrolyzing vinyl cyclohexene dioxide (i.e., diepoxide).

D. Acrolein and R-substituted acrolein cyclic acetals of tetra- and higher hydroxy-substituted carbohydrates, i.e., sugars, sugar alcohols, and soluble starch hydrolysates; such as the di- and higher acrolein acetals of galactose, sorbitol, mannitol, and dextrin; for example 1,2:5,6-di-O-allylidene-D-glucofuranose and the acetate of 1,2:3,4-di-O-allylidene-D-galactopyranose.

E. Acrolein and R-substituted acrolein cyclic acetals of oligomers (soluble, low molecular weight polymers) of vinyl and allyl alcohols and derivatives thereof containing four or more hydroxyl groups per molecule, wherein preferably not more than four carbon atoms separate adjacent hydroxyl groups.

The mono- and polyfunctional compounds that are required in this invention can be prepared not only from the specific classes of starting materials and by the specific methods described in the ensuing examples but also, for example, by condensing under the general conditions set forth herein acrolein or an appropriate alpha-substituted acrolein with other classes of compounds containing hydroxyl or epoxy (e.g., oxirane) groups which are capable of cyclic acetalization, these compounds also containing further substituents, if desired, and having the other structural features required in the formula of the desired vinyl cyclic acetal. Still further methods include dehalogenating or dehydrohalogenating a preformed cyclic acetal in which a halogen-containing 2-substituent becomes a vinyl group or an appropriately alpha-substituted vinyl group as a result of said treatment.

METALLIC DRIER COMPOUNDS

The metallic drier compounds that are required in the compositions of this invention are the well-known siccative metal-containing compounds or complexes which are commonly added to drying and semi-drying oil-containing paints, varnishes, enamels and the like to impart air-drying properties thereto or to improve the air-drying properties. Suitable metals are, for example, cobalt, lead, manganese, zinc, iron, copper, nickel, chromium, cerium, calcium, aluminum, titanium, zirconium and magnesium. They are widely available and commonly used in the form of soluble soaps, salts and the like, such as the chlorides, acetates, hydrates, oxyhydrates, octoates, oleates, linoleates, naphthenates, resinates, alkyl half esters of dicarboxylic acids (e.g., alkyl phthalate), and the chelates of dicarbonyl compounds capable of keto-enol tautomerism like beta-diketones, beta-keto acids and beta-ketoacid esters. Mixtures of such compounds can be used. Cobalt is a preferred metal.

The amount of metallic drier compound used is not critical and varies widely with the kind of metal, the character of the mixture of mono- and polyacetal compounds being used, the air-drying speed desired, and the air temperature.

Metallic drier compounds which are soluble in the desired mixture are preferred, although it is usually expedient to add the drier as a solution in a common solvent.

Ordinarily the amount of metal drier compound used is equivalent to 0.0005%–3% of metal (in the drier) based on the total weight of organic film-forming material. When drying is to occur at normal room or atmospheric temperature, the amount of metal used is preferably about 0.01%–1.0%. When force-drying or baking is employed to shorten the drying period, the preferred amount of metal used is preferably 0.0005%–0.01%.

The new air-drying film-forming compositions of this invention are prepared by simply mixing the monofunctional acetal, polyfunctional acetal and drier in proportions defined hereinbefore. In some cases, the mono- and polyfunctional compounds can occur in mixed form as the product of a single preparation. An example of this is the mixture of mono- and bisacrolein acetals of pentaerythritol, which evolves from treating one mol of pentaerythritol with substantially more than one but less than the two mols of acrolein which can combine with it to form a bis-acetal. Other examples of such native mixtures are mixed mono- and higher esters (or analogous ethers) prepared from a hydroxy-substituted vinyl cyclic acetal and a mixture of mono- and higher carboxylic acids (or analogous alcohols). Such native mixtures are readily converted into products of this invention by the admixing of drier in the previously indicated proportions.

The preferred new compositions of this invention are the liquid mixtures because these lend themselves to the easy preparation of solvent-free liquid end products, a type especially desirable because the cost and fire hazard of volatile organic solvents are eliminated. However, those compositions which are highly viscous or solid are readily soluble in common solvents and can be used in solution form.

Suitable volatile organic solvents include aliphatic and aromatic liquid hydrocarbons, esters, ketones, alcohols and mixtures thereof.

The new compositions can be used as clear, unpigmented coating compositions, with solvent if required for convenience of application, or they can be pigmented, using proportions well known in the art, with pigments commonly used in the coating art, such as metal oxides, sulfides, sulfates, silicates, chromates, iron blues, organic colors, and metal flake pigments. As is the case with other air-drying materials, some pigments retard drying. Normally these are to be avoided in coating compositions formulated to dry at ordinary temperatures, but the retarding effect can be minimized by force-drying or incorporating suitable additives.

The new mixtures can provide the whole organic film-forming component of coating compositions, or they can be blended with other well known film-formers such as vegetable oils, oil-modified alkyd resins, oleoresinous varnishes, alkylated urea aldehyde resins, alkylated melamine aldehyde resins, polyepoxypolyhydroxy resins, acetylated phenol aldehyde resins, cellulose acetate, cellulose acetate butyrate, polymers and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents.

The following examples illustrate the principles and practice of this invention, but they are not intended to limit the scope thereof. Unless otherwise specified, the parts and percentages are given by weight.

*Example 1*

A pigmented house paint of this invention is prepared by carrying out in sequence, as fully described immediately hereafter, the following steps:

(1) Preparation of 4-hydroxybutyl-2-vinyl-1,3-dioxolane, an intermediate used in the preparations of steps 2, 3 and 4.

(2) Preparation of the orthophthalic acid diester of 4-hydroxybutyl-2-vinyl-1,3-dioxolane.

(3) Preparation of the benzoic acid monoester of 4-hydroxybutyl-2-vinyl-1,3-dioxolane.

(4) Preparation of acidic resin, for use as a pigment grinding aid, from phthalic anhydride and 4-hydroxybutyl-2-vinyl-1,3-dioxolane.

(5) Mixing, grinding and finishing of final paint.

*Preparation of 4-hydroxybutyl-2-vinyl-1,3-dioxolane.*— A three-necked flask equipped with a thermometer, a stirrer and a continuous water separator is charged with 670 parts by weight (5 mols) of 1,2,6-hexanetriol, 280 parts (5 mols) of acrolein containing a trace of hydroquinone inhibitor, 375 parts of hexane, 5 parts of oxalic acid and 5 parts of hydroquinone. The mixture is refluxed (50°–67° C.) with continuous removal of water for 24 hrs. (116 parts removed). The mixture is freed of hexane and acrolein by heating to 60° C. and gradually reducing the pressure to less than 1 mm. Hg. Vacuum distillation (106°–122° C./1–3 mm. Hg) of 876 parts of residue gives 642 parts of water-white oil and 225 parts of tan resin. The oil is dissolved in 650 parts of benzene, washed once with 300 parts of 5% sodium hydroxide, once with 320 parts of 5% sodium chloride and once with 200 parts of 0.5% sodium bicarbonate. The organic phase is dried over anhydrous magnesium sulfate, filtered and substantially freed of benzene at reduced pressure. After heating 30 min. at 50°–60° C./1 mm., 582 parts of 4-hydroxybutyl-2-vinyl-1,3-dioxolane, more specifically 4-(4′-hydroxybutyl)-2-vinyl-1,3-dioxolane, are obtained. Analysis indicates that the product has the structural formula:

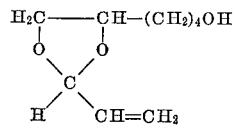

*Preparation of orthophthalic acid diester.*—A three-necked flask equipped with a thermometer, a stirrer, nitrogen inlet and an 18-inch helix-packed column topped with a total reflux head is charged with 194 parts (1 mol) of dimethyl orthophthalate, 413 parts (2.4 mols) of 4-hydroxybutyl-2-vinyl-1,3-dioxolane and 260 parts of toluene. The system is purged with nitrogen, and about 86 parts of toluene are distilled off to dry the reaction mixture and the apparatus. After cooling to about 30° C., 3 parts of sodium methoxide are added, and the mixture is heated to reflux (about 95° C.). Toluene-methanol binary is distilled off during the ensuing 2.5 hours. A total of 125 parts of distillate are collected. At this point, the charge temperature is 144° C. and the vapor temperature is 109° C. The charge is cooled to room temperature and dissolved in a mixture of 220 parts of benzene and 300 parts of hexane. The resulting solution is washed four times with water, and the organic phase is separated and dried over anhydrous magnesium sulfate. After filtering, the mixture is substantially freed of solvent and unreacted 4-hydroxybutyl-2-vinyl-1,3-dioxolane by heating at about 60° C. and about 1 mm. of mercury. 461 parts of liquid pale yellow orthophthalic acid diester of 4-hydroxybutyl-2-vinyl-1,3-dioxolane are obtained. Analysis indicates that this has the structural formula:

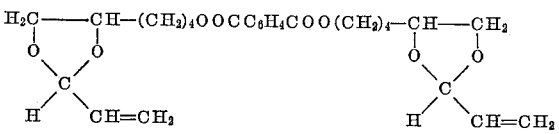

*Preparation of benzoic acid monoester.*—Apparatus as described in the preceding step is charged with 442 parts (3.2 mols) of methyl benzoate, 448 parts (2.6 mols) of 4-hydroxybutyl-2-vinyl-1,3-dioxolane and 350 parts of toluene. The system is purged with nitrogen, and about 125 parts of toluene are distilled off to dry the reaction mixture and the apparatus. After cooling to about 30° C., 4 parts of sodium methoxide are added, and the mixture is heated to reflux (about 90° C.). Toluene-methanol binary is distilled off during the ensuing 2.5 hours during which the temperature is 90°–140° C. The charge is cooled to room temperature and dissolved in a mixture of 160 parts of benzene and 130 parts of hexane. The resulting solution is washed four times with water, and the organic phase is separated and dried over anhydrous magnesium sulfate. After filtering, the mixture is substantially freed of solvent and the product distilled, 146°–152° C./0.2 mm. of mercury. 654 parts of benzoic acid monoester of 4-hydroxy-butyl-2-vinyl-1,3-dioxolane are obtained. Analysis indicates that this has the structural formula:

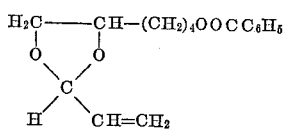

*Preparation of acidic resinous grinding aid.*—A three-necked flask equipped with a thermometer, agitator and condenser with distillation head is charged with 275 parts (1.6 mols) of 4-hydroxybutyl-2-vinyl-1,3-dioxolane, 148 parts (1 mol) of phthalic anhydride and 40 parts of xylene. The charge is refluxed at 178°–223° C. for six hours and then is distilled at 210° C. for 30 minutes to remove volatile components. 370 parts of resinous amber material are obtained (acid number 7.1).

*Preparation of paint*

First portion: Parts by wt.
- Benzoic acid monoester prepared above _____ 127
- Orthophthalic acid diester prepared above ___ 186
- Acidic resinous grinding aid prepared above __ 14
- Titanium dioxide pigment (chalking type) ___ 137
- Titanium dioxide pigment (non-chalking type) 59
- Magnesium silicate extender _____ 133

Second portion:
- Aromatic hydrocarbon solvent _____ 25
- Drier solution:
  - Cobalt butyl phthalate (10.9% cobalt) __ 2.42
  - Ethyl alcohol _____ 20

The ingredients of the first portion are ground in conventional paint grinding apparatus to produce a smooth dispersion into which the ingredients of the second portion are admixed.

In the overall formula, monofunctional vinyl cyclic acetal and difunctional vinyl cyclic acetal are present in the proportions of about 40:60, and cobalt metal is present in the amount of about 0.08% based on the total weight of organic film-forming material.

The composition (house paint) of this example is applied by brush to glass test panels and to wood siding which are left to dry in air at about 70° F. The coatings dry tack-free in 5–6 hours, and hard in 24 hours.

In the formula of this example, the presence of the acidic resinous grinding aid is not critical; it is included to improve the wetting characteristics of the organic film-forming material and produce a better dispersion. The benzoate monoester and the phthalate diester can be used in this formula, with substantially equal results, in proportions of about 0.5%–70% benzoate monoester and, complementally, 99.5%–30% phthalate diester, the total weight remaining substantially the same.

Also, substantially equal results are obtained by substituting various mixtures in the range of 0.5–90% of benzoate monoester and, complementally, 99.5–10% of itaconic acid diester (prepared in Example 2) for the benzoate/phthalate mixture of Example 1, again with the total weight remaining substantially the same.

*Example 2*

Clear coating compositions, suitable for protecting wood and metal articles, are prepared by mixing a cyanoethyl monoether and an itaconic acid diester in formulas having the proportions indicated below. Pigmentation can be accomplished, if desired, by grinding pigment into the system generally as indicated in Example 1.

*Preparation of itaconic acid diester.*—The itaconic acid diester of 4-hydroxybutyl-2-vinyl-1,3-dioxolane is prepared by substituting 158 parts by weight (1 mol) of dimethyl itaconate containing 0.75 part of hydroquinone polymerization inhibitor for the 194 parts of dimethyl orthophthalate and 3 parts of tetrabutyl titanate for the sodium methoxide used in the orthophthalate diester preparation of Example 1 and thereafter following the general reaction procedure described there. Analysis indicates that the resulting itaconate diester has the structural formula:

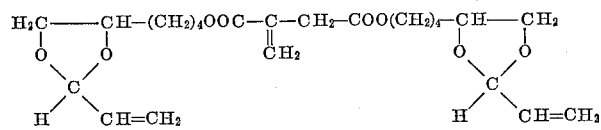

*Preparation of cyanoethyl monoether.*—The beta-cyanoethyl monoether of 4-hydroxybutyl-2-vinyl-1,3-dioxolane is prepared by reacting 172 parts (1 mol) of 4-hydroxybutyl-2-vinyl-1,3-dioxolane with 53 parts (1 mol) of acrylonitrile at room temperature in the presence of 1 part of a 35% solution of trimethylbenzylammonium hydroxide in methanol as a catalyst. The dioxolane and the catalyst are mixed and the acrylonitrile is gradually added thereto over a one hour period with agitation. The mixture is stirred for an additional hour and then neutralized with acetic acid. The reaction mixture is distilled under reduced pressure using a short Vigreux column, collecting the fraction (178 parts) boiling from 113° C. to 124° C. at .2 to .4 mm. of Hg. Analysis indicates that the collected fraction has the structural formula:

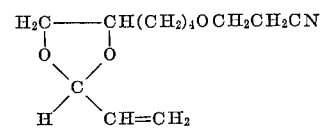

The itaconate diester and the cyanoethyl monoether prepared above are mixed in the parts by weight shown in the following table, and to each mixture are added 2.5 parts by weight of a 6% solution of cobalt octoate in toluene. This added solution contains about 1% cobalt, and the resulting coating composition contains about 0.5% of cobalt metal based on the total film-forming material (diester plus monoether). Coatings of the resulting clear mixtures are applied to test panels which are set out to dry in air at room temperature. The time required for each coating to air dry to a tack-free condition is recorded in the table.

TABLE I

| Itaconate diester | Cyanoethyl monoether | Weight proportions | Tack-free time (hours) |
| --- | --- | --- | --- |
| 4.975 | 0.025 | 99.5:0.5 | 6 |
| 4.5   | 0.5   | 90:10    | 6 |
| 4.0   | 1.0   | 80:20    | 6 |
| 3.0   | 2.0   | 60:40    | 6 |
| 2.0   | 3.0   | 40:60    | 8 |
| 1.0   | 4.0   | 20:80    | 24 |
| 0.5   | 4.5   | 10:90    | (¹) |

¹ Slightly tacky at 24 hours. Dries tack-free in 24 hours when pigmented generally as in Example 1.

Analogous compositions from which the cobalt drier is omitted remain wet during 5 days' exposure to air at room temperature.

*Example 3*

Clear coating compositions, suitable for protecting wood and other articles, are prepared in this example from mixtures of the itaconate diester of Example 2 and 5-(beta-cyanoethoxymethyl) - 5-methyl - 2 - isopropenyl - 1,3 - dioxane, respectively, as the poly- and monofunctional vinyl cyclic acetals. The monofunctional compound is prepared in two steps as follows:

*Preparation of methacrolein acetal of trimethylolethane.*—A three-necked flask equipped with a thermometer, an agitator and a reflux condenser with water trap is charged with 247 parts by weight (2.06 mols) of trimethyloethane, 173 parts (2.5 mols) of methacrolein, 150 parts of benzene and 3 parts of oxalic acid. The charge is refluxed for 8 hours at about 79°–99° C. About 36 parts of condensate are taken from the trap. The resulting crude composition is fractionally distilled under vacuum, and the portion (290 parts) coming off at 85°–89° C. and 0.4 mm. Hg is retained as 5-hydroxymethyl-5-methyl-2-isopropenyl-1,3-dioxane, which has the structural formula:

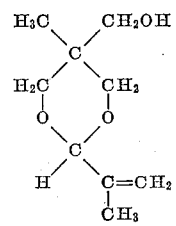

*Preparation of cyanoethyl monoether.*—The beta-cyanoethyl ether of 5-hydroxymethyl-5-methyl-2-isopropenyl-1,3-dioxane is prepared by reacting 172 parts (1 mol) of this dioxane with 70 parts (1.32 mols) of acrylonitrile in the presence of 1 part of a catalyst solution (35% trimethylbenzylammonium hydroxide in methanol). The acrylonitrile is added, dropwise with agitation, to a mixture of the dioxane and the catalyst solution at a temperature of about 25° C. maintained by means of an ice bath. The resulting reaction mixture is stirred for 2 hours and is then fractionally distilled under vacuum. The portion (167 parts) which comes off at 117°–120° C. and 0.3 mm. Hg is retained as 5-(beta-cyanoethoxymethyl)-5-methyl-2-isopropenyl-1,3-dioxane, which has the structural formula:

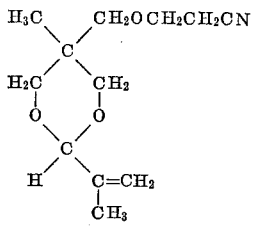

*Preparation of coating compositions.*—The itaconate diester of Example 2 and the cyanoethyl ether prepared directly above are mixed in parts by weight as indicated in the following table, and to each mixture is added 0.5 part by weight of a 31.7% solution of lead butyl phthalate in xylene. This is equivalent to 1% of lead on the total of diester and monoether. Coatings of the resulting clear mixtures are applied to test panels which are set out to dry in air at room temperature. The time required for each coating to dry to the tack-free stage is recorded.

TABLE II

| Itaconate diester | Cyanoethyl ether | Weight proportions | Tack-free time (hours) |
|---|---|---|---|
| 4.5 | 0.5 | 90:10 | 24 |
| 4.0 | 1.0 | 80:20 | 48 |
| 3.0 | 2.0 | 60:40 | 48 |
| 2.0 | 3.0 | 40:60 | (¹) |
| 1.5 | 3.5 | 30:70 | (¹) |

¹ Sticky, heavily bodied at 5 days.

All of these compositions become tack-free within 30 minutes when force-dried at 100° C.

Analogous compositions from which the lead drier is omitted remain wet during 5 days exposure to air at room temperature.

*Example 4*

Further clear coating compositions of this invention are prepared in this example from mixtures of the fumarate diester and the benzoate monoester, respectively, of 4-hydroxybutyl-2-vinyl-1,3-dioxolane. The monofunctional benzoate ester is prepared in Example 1. The fumarate diester is prepared as follows:

*Preparation of fumaric acid diester.*—43 parts of diethyl fumarate, 89.4 parts of 4-hydroxybutyl-2-vinyl-1,3-dioxolane, and 175 parts of toluene together with 3 parts of tetraisopropyl titanate are refluxed at about 77° C. for about 4 hours. Finally, 200 parts of toluene are added to the mixture, which is then washed with water, dried with calcium sulfate, filtered and heated at about 60° C. under a pressure of about 1 mm. of mercury to strip off the low boiling materials. Analysis indicates that the resulting product has the structural formula:

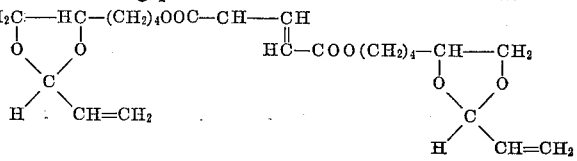

The fumarate diester and the benzoate monoester are mixed in the parts by weight indicated in the following table, and to each mixture are added 1.2 parts by weight of a nickel butyl phthalate solution containing 4.1% nickel. This is equivalent to 1% nickel based on the esters. Coatings of the resulting mixtures are applied to test panels and are exposed to air at room temperature. This time required for each coating to dry to the tack free stage is recorded.

TABLE III

| Fumarate diester | Benzoate ester | Weight proportions | Tack-free time (hours) |
|---|---|---|---|
| 4.5 | 0.5 | 90/10 | 24 |
| 4.0 | 1.0 | 80/20 | 72 |
| 3.0 | 2.0 | 60/40 | 120 |
| 2.0 | 3.0 | 40/60 | (¹) |
| 1.5 | 3.5 | 30/70 | (¹) |

¹ Sticky, heavily bodied at 5 days.

All of these compositions become tack-free within 15 minutes when force dried at 100° C.

Analogous compositions from which the nickel drier is omitted remain wet during 5 days exposure to air at room temperature.

*Example 5*

Additional coating compositions of this invention are prepared from mixtures of a polyfunctional vinyl cyclic acetal composition, which is derived from sorbitol, and the cyanoethyl monoether prepared in Example 3.

*Preparation of acrolein acetals of sorbitol.*—In apparatus like that used in the foregoing acetal preparations, 184 parts by weight (1 mol) of sorbitol, 224 parts (4 mols) of acrolein, 200 parts of benzene and 4 parts of oxalic acid are refluxed at 59°–74° C. for six hours. 50 parts of condensate are taken off. Then the charge is stripped of volatile components by heating at about 100° C. and 1 mm. Hg for one hour. This yields 275 parts of a pale yellow product having a hydroxyl equivalent of 208. Analysis indicates that it is predominantly a mixture of di- and triacrolein acetals having the structural formulas:

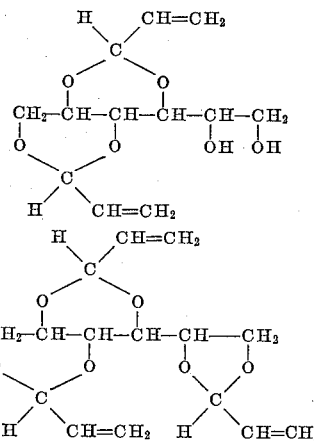

A small proportion of unreacted sorbitol and/or the acrolein monoacetal thereof may be present.

*Preparation of benzoic acid ester.*—A benzoic acid ester of the hydroxyl-containing mixed acetal prepared diretcly above is made as follows:

First portion: Parts by wt.
Benzoyl chloride (0.3 mol) _____ 42
Benzene _____ 30

Second portion:
  Mixed acetal (0.25 mol of OH) _____ 52
  Benzene _____ 22
  Aqueous 20% sodium hydroxide _____ 200

The first and second portions are mixed separately. Then the second portion is slowly added to the first portion with agitation over a period of 30 minutes, while holding the temperature at about 25° C. with an ice bath. The resulting reaction mixture is stirred for an additional two hours. Upon settling, the aqueous phase is decanted and discarded, and the organic phase is centrifuged. The resulting clear organic material is stripped of volatile components by heating to substantially constant weight at about 60° C. under the vacuum produced by a simple water aspirator. There are obtained 57 parts by weight of a pale yellow gummy substance having a hydroxyl equivalent of 1612, which indicates conversion of a high proportion of the original hydroxyl groups to benzoate groups in the various positions indicated in the structural formulas set forth directly above.

*Preparation of coating compositions.*—The benzoate ester prepared directly above, which is polyfunctional with respect to vinyl cyclic acetal radicals, is mixed with the monofunctional 5-(beta-cyanoethoxymethyl)-5-methyl-2-isopropenyl-1,3-dioxane (prepared in Example 3) in parts by weight as indicated in the following table. To each mixture is added 0.25 part by weight of an 8.5% solution of cobalt butyl phthalate in xylene. This is equivalent to 0.05% of cobalt on the total benzoate ester and cyanoethyl ether. Coatings are drawn under a 4.2 mil doctor knife on test panels, which are set out to dry in air at room temperature. The dry coatings are about 2.5 mils thick. The time required for each coating to dry to a tack-free condition is recorded.

TABLE IV

| Benzoate ester of sorbitol-acrolein acetals | Cyanoethyl ether (Example 3) | Weight proportions | Tack-free time (hours) |
| --- | --- | --- | --- |
| 4.0 | 1.0 | 80:20 | 16 |
| 3.0 | 2.0 | 60:40 | 22 |
| 2.0 | 3.0 | 40:60 | (¹) |
| 1.5 | 3.5 | 30:70 | (¹) |

¹ Very slightly tacky at 7 days. Dries tack free when pigmented.

*Example 6*

The preparation and testing of coating compositions described in Example 5 is repeated substantially except for substituting the cyanoethyl monoether prepared in Example 2 for the one used in Example 5. The results are as follows:

TABLE IV

| Benzoate ester of sorbitol-acrolein acetals | Cyanoethyl ether (Example 2) | Weight proportions | Tack-free time (hours) |
| --- | --- | --- | --- |
| 4.5 | 0.5 | 90:10 | 8 |
| 4.0 | 1.0 | 80:20 | 8 |
| 3.0 | 2.0 | 60:40 | 10 |
| 2.0 | 3.0 | 40:60 | (¹) |
| 1.5 | 3.5 | 30:70 | (¹) |

¹ Very slightly tacky at 7 days. Dries tack-free when pigmented.

*Example 7*

Five additional compositions of this invention are prepared by mixing the benzoate ester of sorbitol-acrolein acetals (Example 5) with various monofunctional vinyl cyclic acetals identified below under paragraphs A–E in the weight proportion of 60:40 and adding 0.1% cobalt as cobalt 2-ethyl hexoate. Coatings are prepared and tested as indicated in the foregoing examples. All dry tack-free in 22 hours or less.

A. 4 - phenyl - 2-isopropenyl-1,3-dioxolane having the structural formula:

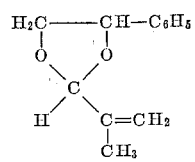

prepared from 70 parts of methacrolein, 138 parts of phenyl glycol and 1 part of oxalic acid by the general procedure of the first step of Example 1.

B. The benzoate monoester prepared in Example 1.

C. 2[4' - (2'' - vinyl - 1'',3'' - dioxolan-4''-yl)butoxy]-tetrahydropyran having the structural formula

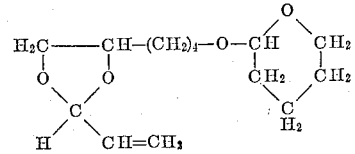

prepared by heating 172 parts of 4-hydroxybutyl-2-vinyl-1,3-dioxolane, 101 parts of dihydropyran and 1 part of oxalic acid for 3 hours at 100°–110° C., diluting with benzene, washing with caustic, drying, and vacuum fractionating at 115°–120° C and about 0.4 mm. Hg.

D. Spiro(3 - vinyl - 2,4 - dioxane-6,6'-cyclohex-2'-ene) which has the structural formula:

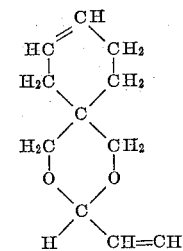

prepared from 126 parts of acrolein, 240 parts of 3-cyclohexene - 1,1-dimethanol, or 3,3-bis(hydroxymethyl) cyclohexene, and 2 parts of oxalic acid by the general procedure of the first step of Example 1.

E. The undecylenic acid ester of the mixed acetals obtained from glycerine and acrolein. The esters have the structural formulas:

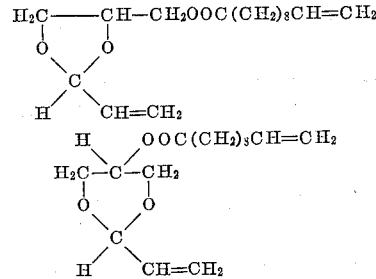

These are made by first preparing the mixed acrolein acetals of glycerine by substituting 5 mols of glycerine for the hexanetriol in the first step of Example 1 and following the general procedure described there. Then 79 parts of this product, 110 parts of methyl undecylenate and 0.07 part of litharge are heated for 3 hours at about 200° C. and 200 mm. Hg. The product is fractionally distilled at 122° C. and 0.2 mm. Hg.

The following six examples (8–13) use the bis-acrolein acetal of pentaerythritol, as a difunctional vinyl cyclic acetal, and various monofunctional vinyl cyclic acetals in mixed compositions of this invention. The bis-acrolein acetal of pentaerythritol has the structural formula:

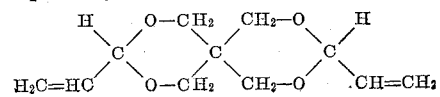

It is available as "Pentacrol" 3,9-divinyl spirobi(metadioxane) from Carbide and Carbon Chemical Co.

In all of these examples 0.05% of cobalt is present in the form of cobalt butyl phthalate. The mixtures are prepared in the proportions indicated and applied to test panels with a 2.4 mil doctor blade. Upon drying in air, the coatings are about 1.5 mils thick.

*Example 8*

"Pentacrol" and the benzoate ester of Example 1 in proportions of 60:40 and 40:60 respectively dry tack-free and hard within 24 hours. A 20:80 mixture is slightly tacky at 24 hours and dries tack-free when pigmented.

*Example 9*

"Pentacrol" and the cyanoethyl monoether of Example 2 in proportions of 66:34, 60:40 and 40:60 respectively dry tack-free and hard within 24 hours. A 20:80 mixture is slightly tacky at 24 hours and dries tack-free when pigmented.

*Example 10*

"Pentacrol" and the cyanoethyl monoether of Example 3 in proportions of 66:34 and 60:40 respectively dry tack-free within about 4 days.

*Example 11*

"Pentacrol" and the tetrahydropyran derivative of Example 7C in proportions of 60:40 and 40:60 respectively dry tack-free within 24 hours. Mixtures in the proportions of 20:80 and 10:90 are slightly tacky at 24 hours and dry tack-free when pigmented.

*Example 12*

"Pentacrol" and the phenyl derivative of Example 7A in proportions of 70:30, 60:40, 40:60 and 20:80 respectively dry tack-free within 24 hours. (In these compositions 0.25% cobalt is used.)

*Example 13*

"Pentacrol" and the cyclohexene derivative of Example 7D in proportions of 70:30, 60:40, 40:60, 20:80 and 10:90 respectively dry tack-free within 24 hours.

The following three examples (14–17) illustrate pigmented compositions of this invention in which the essential organic film-forming material is modified by the addition of other film-forming materials.

*Example 14*

A corrosion inhibiting paint for steel or rusted steel is prepared by grinding the following formula in conventional paint grinding apparatus until a smooth dispersion is produced:

| | Parts by wt. |
|---|---|
| Itaconic acid diester of Example 2 | 11.6 |
| Cyanoethyl monoether of Example 2 | 11.6 |
| Linseed oil | 11.6 |
| Litharge pigment | 19.2 |
| Iron oxide pigment | 44.4 |
| Cobalt butyl phthalate solution in ethyl alcohol (10.9% Co) | 0.8 |
| Lead naphthenate solution in mineral spirits (24% Pb) | 0.4 |
| Manganese linoleate solution in mineral spirits (6% Mn) | 0.4 |
| | 100.0 |

Coatings of this paint are brushed on clean steel and rusted steel structural members. The coatings dry tack-free in about 8 hours. Single coats have dry thicknesses of 3–5 mils, and multiple coats have thicknesses up to about 25 mils. The coatings protect the steel and prevent rusting, or further rusting, substantially longer than an analogous paint in which linseed oil is the sole film-former, replacing all of the first two components of the formula. This additional protection exists when the coatings described are the sole coatings as well as when they serve as primers and are topcoated with conventional exterior paints.

*Example 15*

A black baking enamel is prepared by grinding 5 parts of carbon black pigment in 120 parts of a 50% solution of a 37% coconut oil modified alkyd resin in toluene. To the resulting smooth dispersion are added 60 parts of a 50% solution of butylated urea formaldehyde resin in butanol, 5 parts of the orthophthalic acid diester of Example 1, 5 parts of the benzoic acid monoester of Example 1 and 0.02 part of cobalt in the form of cobalt octoate. This product, when diluted, sprayed on primed metal and baked for 30 minutes at 280° F. yields a durable, adherent, and protective coating suitable for automobile bodies.

*Example 16*

An unsupported film is prepared by thoroughly mixing the following ingredients and casting a film from the mixture.

| | Parts by wt. |
|---|---|
| Heptane | 5.6 |
| Cerium naphthenate | 0.3 |
| Polyvinyl chloride powder ("Geon" 121) | 56.4 |
| Bis[4-(2'-vinyl-1',3'-dioxolan-4'-yl)butyl]sebacate | 25.1 |
| Benzoic acid monoester of Example 1 | 12.6 |
| | 100.0 |

The sebacate ester is prepared by substituting 1 mol of dimethyl sebacate for dimethyl orthophthalate in the phthalate ester preparation of Example 1 and following the general procedure described there.

A wet coating about 15 mils thick is cast on a polished plate. The coated plate is exposed to air at room temperature for about 30 minutes and is then forced-dried for about 5 minutes in an oven at 180° C. A strong pliable film thus produced is stripped off the plate when cool. The film is useful for electrical insulation, packaging and as the outside layer in a multi-ply laminate of coated fabric for luggage, upholstery and book covers.

This composition before casting, can be pigmented to provide opaque colored films.

*Example 17*

A clear varnish is prepared by heating to 250° C. a mixture of 100 parts of the previously described "Pentacrol," 100 parts of soya bean oil and 100 parts of the stearic acid ester of 4-hydroxybutyl-2-vinyl-1,3-dioxolane (prepared by substituting 3.2 mols of methyl stearate for the methyl benzoate in the monoester preparation of Example 1 and following the general procedure described there). The heating is carried out under a carbon dioxide blanket which is maintained during the remainder of the preparation. To the hot mixture are added 100 parts of ester gum (rosin-glycerine ester). Agitation and heating at about 250° C. are continued until the gum is dissolved. The resulting mixture is cooled and diluted with 300 parts of mineral spirits containing 0.15 part of cobalt as cobalt linoleate. A thin coating of the resulting varnish brushed out on wood dries to a hard, glossy coating.

*Example 18*

A clear unpigmented coating composition of this invention is prepared by mixing 80 parts by weight of 1,2:3,4-di-O-allylidene-D-galactopyrano benzoate and 20 parts by weight of the benzoate monoester of Eaxmple 1 with 0.1 part of cobalt in the form of cobalt butyl phthalate solution. A coating of the mixture air-drys to a tack-free condition in about 24 hours.

The first-mentioned benzoate ester of this example is prepared as follows:

*Preparation of 1,2:3,4-di-O-allylidene-D-galactopyran benzoate.*—56 parts (1 mol) of acrolein, 26 parts (0.1 mol) of 1,2:3,4-di-O-isopropylidene-D-galactopyranose and 0.2 part of oxalic acid are refluxed at about 60° C.

for six hours. Volatile components are then distilled off under reduced pressure using an open steam bath for heat. The residue is taken up in 100 ml. of diethyl ether. 10 parts (0.12 mol) of pyridine are added to the solution. Then 14.1 parts (0.1 mol) of benzoyl chloride are added drop-wise with agitation at 0°–5° C. during a period of about 1 hour, after which the mixture is stirred at about 0° C. for an additional two hours. Then the mixture is washed successively with 25 ml. of water, 25 ml. of aqueous 5% sodium hydroxide and 25 ml. of water. The organic phase is separated, dried over anhydrous magnesium sulfate, filtered, finally freed of ether at reduced pressure, and retained as the desired product.

*Example 19*

A corrosion inhibiting paint is prepared by grinding the following formula in conventional paint grinding apparatus until a smooth dispersion is produced:

| | Parts by wt. |
|---|---|
| Acetoacetate monoester of 4-hydroxybutyl-2-vinyl-1,3-dioxolane | 16 |
| Acrolein acetals of sorbitol prepared in Example 5 | 32 |
| Litharge pigment | 27 |
| Iron oxide pigment | 16 |

The acetoacetate ester is prepared by substituting 3.2 mols of ethyl acetoacetate for the methyl benzoate used in the benzoic acid monoester preparation of Example 1 and thereafter following substantially the procedure described there.

Cobalt drier is added to the paint as 3.6 parts by weight of an 8.5% solution of cobalt butyl phthalate in xylene (0.1% cobalt based on the organic film-forming ingredients). Coating brushed on clean steel and on rusted steel dry tack-free in about 8 hours.

*Example 20*

A glossy architectural enamel of this invention is prepared by grinding the following formula as indicated hereinbefore:

| | Parts by wt. |
|---|---|
| Tetrahydropyranyl monoether of Example 7C | 10.5 |
| Benzoate ester of Example 5 | 20.9 |
| Acidic resinous grinding aid of Example 1 | 1.0 |
| Zinc oxide pigment | 1.2 |
| Titanium dioxide pigment | 23.2 |

2 parts by weight of an 8.5% solution of cobalt butyl phthalate in xylene are added (0.075% cobalt based on the organic film-forming ingredients). A coating brushed on primed wood dries to a glossy enamel in 11 hours.

*Examples 21–24*

Four additional house paints of this invention are prepared as described in the paint preparation part of Example 1.

The examples shown illustrate the variety of both mono- and polyfunctional 2-vinyl-1,3-cyclic acetal compounds which are useful in the mixtures of the invention. The compounds used in the examples are preferred forms of their respective classes for reasons of cost, direct availability or availability of raw materials, ease of preparation, and generally desirable properties. The examples thus disclose the currently contemplated best modes of practicing the invention. However, it is to be understood that one or more of the various mono- or polyfunctional compounds or metallic drier compounds described under the foregoing captions, "Monofunctional Compounds," "Polyfunctional Compounds" and "Metallic Drier Compounds'" can be substituted for all or part of a member of the corresponding class in any of the foregoing working examples or in any other composition within the scope of this invention as set forth hereinbefore.

For example, with respect to both mono- and polyfunctional compounds, although the 2-substituent in the cyclic acetal radical is preferably vinyl or alphamethyl vinyl (as from acrolein or methacrolein, respectively), this substituent can be any R radical previously defined.

The formulas and their respective drying times are shown in the table below.

| | Parts by wt. | | | |
|---|---|---|---|---|
| | Ex. 21 | Ex. 22 | Ex. 23 | Ex. 24 |
| Acrolein acetals of sorbitol prepared in Example 5 | 28.6 | | | |
| Cyclohexene derivative prepared in Example 7D | 3.2 | | | |
| Cyanoethyl monoether of Example 2 | | 15.9 | | |
| "Pentacrol" | | 15.9 | | |
| Methacrylate monoester of 4-hydroxybutyl-2-vinyl-1,3-dioxolane [1] | | | 28.6 | 15.9 |
| Cyanoethyl ether of acrolein acetals of sorbitol [2] | | | 3.2 | 15.9 |
| Acidic resinous grinding aid of Example 1 | 2.6 | 2.6 | 2.6 | 2.6 |
| Zinc oxide pigment | 17.2 | 17.2 | 17.2 | 17.2 |
| Titanium dioxide pigment | 11.6 | 11.6 | 11.6 | 11.6 |
| Magnesium silicate pigment | 25.0 | 25.0 | 25.0 | 25.0 |
| Cobalt butyl phthalate (8.5% solution in xylene) | 3.4 | 3.4 | 3.4 | 3.4 |
| Tack-free time in hours | 11 | 24 | 48 | 24 |

[1] Methacrylate monoester of 4-hydroxybutyl-2-vinyl-1,3-dioxolane is prepared by substituting 2 mols of methyl methacrylate containing 0.75 part of hydroquinone polymerization inhibitor for the 194 parts dimethyl orthophthalate and 3 parts of tetrabutyl titanate for the sodium methoxide used in the orthophthalate diester preparation of Example 1 and thereafter following substantially the procedure described there.

[2] Cyanoethyl ether of acrolein acetals of sorbitol prepared by carrying out the general procedure of the cyanoethyl ether preparation of Example 2 using, in place of the 172 parts of 4-hydroxybutyl-2-vinyl-1,3-dioxolane employed therein, 134 parts of the mixed sorbitol-acrolein acetals prepared in Example 5.

More specifically, substantially equimolar proportions of the following substituted acroleins can be used in place of all or part of the corresponding acrolein in any of the foregoing working examples to yield mono- or polyfunctional compounds which have the corresponding R substituent and are useful in the compositions of this invention:

Alpha-methacrolein.
Alpha-acetoxyacrolein, from the acetylation of pyruvic aldehyde.
Alphaphenylacrolein, from the oxidation of alpha-methyl styrene.
Alphachloroacrolein.
Alphacyanoacrolein, from the dehydrochlorination of the adduct of acrolein and cyanogen chloride.
Alphacarbomethoxy acrolein, from the oxidation of methyl methacrylate with selenium dioxide.
Alphafluoroacrolein, from reaction of sodium fluoride with the tosylate of pyruvic aldehyde.
Alphabromoacrolein, from the dehydrobromination of alpha, beta-dibromopropionaldehyde with triethylamine.
Alpha(omega-chloropropyl)acrolein, from reaction of formaldehyde with omega-chloropentanal.
Alpha(cyanoethyl)acrolein, from cyanoethylation of beta-chloropropionaldehyde followed by dehydrochlorination.
Alphaphenoxyacrolein, by reaction of formaldehyde with beta-phenoxyacetaldehyde.
Alphaethyoxyacrolein, by reaction of formaldehyde with beta-ethoxyacetaldehyde.
Alphafluoroethylacrolein, from reaction of omega-fluorobutyraldehyde with formaldehyde.

The compositions of this invention which result from such substitutions have the common property of air drying, i.e., curing, polymerizing, or becoming insoluble in the presence of air, at a more or less rapid rate depending on the properties of the individual compounds present. Some require force-drying or baking to yield an acceptably fast drying speed.

Coating compositions of this invention are useful for the protection and/or decoration of structures and articles made of metal, wood, ceramics, glass, woven and non-woven fabrics, fibers, plaster, concrete, asbestos, wire and the like. Many varieties of bare wood contain substances which inhibit the drying of coatings containing the new compositions of this invention. Hence, when using wood, it is usually desirable to apply and dry a first or priming coat of a different composition. Primers and undercoats can also be used, if desired, on other kinds of substrates. Also, coating compositions of this invention can be used as primers or undercoats, with subsequent coatings of the same, similar, or different compositions applied thereover.

The utility of the new compositions of this invention is not limited to coatings, although this is a preferred use. Specific coating uses include the painting of structural steel (particularly rusty steel or steel having mill scale on the surface), automobiles, refrigerators, washing machines, furniture, office equipment, partitions and other industrial products. Some of the new compositions are particularly useful where the coated article is subsequently formed into a final product as in the case of cans, venetian blinds, siding for buildings and screw caps for containers. Further coating uses include architectural paints and enamels, paper and fabric coatings, and electrical insulation. Other uses include calks and putties, molding and casting resins, modifiers and matrixes for polymers, chemical intermediates, fiber treatments and modifiers, impregnants for fabrics and papers, adhesives and bonding agents, unsupported sheeting, and stencilling and printing inks for paper, textiles, linoleum, containers and the like.

Many widely different embodiments of this invention can be made, in the light of the teachings herein, in addition to those described in the specific examples. The invention is not intended to be limited except as indicated in the appended claims.

I claim:
1. A liquid free-flowing air-drying film-forming coating composition consisting essentially of a mixture of (1) at least one compound which contains a single 1,3-cyclic acetal radical and which is a member of the group consisting of dioxolanes, dioxanes, dioxepanes, dioxocanes, dioxonanes and dioxecanes, and esters and ethers thereof, (2) at least one compound containing at least two 1,3-cyclic acetal radicals of the class consisting of dioxolane, dioxane, dioxepane, dioxocane, dioxonane and dioxecane radicals which are connected to each other by a member of the class consisting of (a) a common spiro carbon atom and (b) common carbon atoms in fused rings and (3) siccative metallic drier compound of the class consisting of salts and chelates of siccative metals in an amount equivalent to 0.0005%–3% of metal based on the total weight of organic film-forming material; both compounds (1) and (2) having on the carbon atom in the 2-position of each of said 1,3-cyclic acetal radical a hydrogen substituent and a substituent having the formula

—C=CH₂
|
R

in which R is a monovalent radical selected from the class consisting of hydrogen, alkyl, alkenyl, aryl, chloro, fluoro, bromo, cyano, acyloxy, chloroalkyl, fluoroalkyl, cyanoalkyl, alkoxy, aryloxy and carbalkoxy.

2. A composition of claim 1 in which said compound defined in (1) and said compound defined in (2) are present in the proportions of 0.5%–90% and complementally 99.5%–10% respectively, based on the total weight of said compounds.

3. A composition of claim 1 in which said compound defined in (1) and said compound defined in (2) are present in the proportions of 10%–90% and complementally 90%–10% respectively, based on the total weight of said compounds.

4. A composition of claim 1 in which said compound defined in (1) has the structural formula

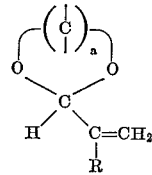

in which

represents carbon atoms in the ring, a being an integer having a value of 2–7, all of the valences of said carbon atoms being satisfied by monovalent radicals of the class of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl, fluoroaryl, acyoxy, acyloxyalkyl, carbalkoxy and alkylcarbalkoxy when the value of a is 2, and consisting additionally of fluoro, chloro, acylamindo and phenylsulfonyl when the value of a is greater than 2; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy.

5. A composition of claim 1 in which component (2) is a benzoic acid ester of mixed sorbitolacrolein acetals.

6. A composition of claim 1 in which said compound defined in (2) is the bis-acrolein acetal of pentaerythritol.

7. A composition of claim 1 in which said compound defined in (2) is 1,2:3,4-di-O-allylidene-D-galactopyranobenzoate.

8. A composition of claim 1 in which component (2) is a mixture of sorbitol-acrolein acetals.

9. A composition of claim 1 in which said compound defined in (2) is a cyanoethyl ether of mixed sorbitol-acrolein acetals.

10. A composition of claim 1 further containing at least one other organic film-forming material.

11. A composition of claim 1 further containing pigment.

12. A composition of claim 1 in which the 1,3 cyclic acetal radicals of the compound defined in (2) are connected to each other by a common spiro carbon atom.

13. A composition of claim 1 in which the 1,3 cyclic acetal radicals of the compound defined in (2) are connected to each other by common carbon atoms in fused rings.

14. A composition of claim 1 in which cobalt is the siccative metal of the drier defined in (3).

15. An article having a coating of a composition of claim 1 which coating has been dried in the presence of oxygen at a temperature of about 40°–400° F.

References Cited by the Examiner
UNITED STATES PATENTS

| | | | |
|---|---|---|---|
| 2,401,776 | 6/1946 | Rothrock | 260—67 |
| 2,578,861 | 12/1951 | Thomas et al. | 260—340.9 |
| 2,895,945 | 7/1959 | Fischer et al. | 260—67 |
| 2,902,476 | 9/1959 | Kern et al. | 260—67 |
| 2,915,498 | 12/1959 | Kraft | 260—67 |
| 2,970,985 | 2/1961 | Guest et al. | 260—67 |
| 2,972,601 | 2/1961 | Guest et al. | 260—67 |
| 2,992,207 | 7/1961 | Guest et al. | 260—17 |
| 3,010,945 | 11/1961 | Ikeda | 260—67 |
| 3,053,792 | 9/1962 | Ideda | 260—16 |

LEON J. BERCOVITZ, *Primary Examiner.*

A. M. BOETTCHER, MILTON STERMAN, P. E. MANGAN, JAMES A. SEIDLECK, *Examiners.*